US012179570B2

(12) United States Patent
Ikemura et al.

(10) Patent No.: US 12,179,570 B2
(45) Date of Patent: Dec. 31, 2024

(54) MOTOR ATTACHMENT STRUCTURE FOR ELECTRIC VEHICLE

(71) Applicant: TOYOTA JIDOSHA KABUSHIKI KAISHA, Toyota (JP)

(72) Inventors: Masashi Ikemura, Toyota (JP); Yukihiko Ideshio, Nisshin (JP); Tetsuya Yamaguchi, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 426 days.

(21) Appl. No.: 17/548,618

(22) Filed: Dec. 13, 2021

(65) Prior Publication Data

US 2022/0194193 A1    Jun. 23, 2022

(30) Foreign Application Priority Data

Dec. 17, 2020  (JP) ................. 2020-209510

(51) Int. Cl.
| | | |
|---|---|---|
| *B60K 1/00* | (2006.01) | |
| *B60K 17/02* | (2006.01) | |
| *H02K 3/50* | (2006.01) | |
| *H02K 5/22* | (2006.01) | |
| *H02K 7/00* | (2006.01) | |
| *H02K 7/108* | (2006.01) | |

(52) U.S. Cl.
CPC ............... *B60K 1/00* (2013.01); *B60K 17/02* (2013.01); *H02K 3/50* (2013.01); *H02K 5/225* (2013.01); *H02K 7/006* (2013.01); *H02K 7/108* (2013.01); *H02K 2203/09* (2013.01)

(58) Field of Classification Search
CPC .......... B60K 1/00; B60K 17/02; B60K 17/08; B60K 17/085; B60K 2001/001; H02K 3/50; H02K 5/225; H02K 5/15; H02K 5/161; H02K 7/006; H02K 7/108; H02K 7/085; H02K 2203/09; B60Y 2304/076; B60Y 2304/078; B60Y 2410/10; B60Y 2410/102; B60Y 2410/1022
See application file for complete search history.

(56) References Cited

U.S. PATENT DOCUMENTS

| 5,532,535 | A | * | 7/1996 | Oltmanns | ............... | H02K 7/116 |
| | | | | | | 310/90 |
| 9,447,864 | B2 | * | 9/2016 | Iwase | .................. | F16H 57/0409 |
| 9,853,373 | B2 | * | 12/2017 | Kurono | ................ | H01R 9/2416 |

(Continued)

FOREIGN PATENT DOCUMENTS

| JP | 2008-072813 A | 3/2008 |
| JP | 2010-252584 A | 11/2010 |

(Continued)

*Primary Examiner* — Steve Clemmons
(74) *Attorney, Agent, or Firm* — Oliff PLC (57) ABSTRACT

A motor attachment structure for an electric vehicle includes: a motor generator including a tubular rotor configured to rotate together with a motor output shaft in an integrated manner, and a tubular stator placed radially outwardly from the rotor; a tubular bearing configured to rotatably support a rotating body rotating together with the motor output shaft in an integrated manner; a case in which the motor generator and the bearing are accommodated; and an attachment attached to the case. The attachment supports an outer peripheral surface of the bearing.

5 Claims, 3 Drawing Sheets

(56) References Cited

U.S. PATENT DOCUMENTS

| | | | | |
|---|---|---|---|---|
| 10,183,567 | B2 * | 1/2019 | Suyama | B60K 6/26 |
| 11,491,857 | B2 * | 11/2022 | Hendricks | B60K 1/00 |
| 11,562,869 | B2 * | 1/2023 | Ikejiri | H01M 10/66 |
| 2006/0244317 | A1 * | 11/2006 | Kramer | B60L 50/16 |
| | | | | 310/20 |
| 2010/0175933 | A1 | 7/2010 | Yoshida | |
| 2014/0283648 | A1 * | 9/2014 | Severinsson | B60K 1/00 |
| | | | | 74/665 F |
| 2019/0301596 | A1 | 10/2019 | Kobayashi et al. | |
| 2022/0166281 | A1 * | 5/2022 | Weis | F16D 21/06 |

FOREIGN PATENT DOCUMENTS

| | | | | |
|---|---|---|---|---|
| JP | 2012206582 A | * | 10/2012 | |
| JP | 2013062901 A | * | 4/2013 | |
| JP | 2013-133828 A | | 7/2013 | |
| JP | 2019-180172 A | | 10/2019 | |
| WO | WO-2012007030 A1 | * | 1/2012 | B60K 1/00 |

* cited by examiner

MOTOR ATTACHMENT STRUCTURE FOR ELECTRIC VEHICLE

CROSS-REFERENCE TO RELATED APPLICATION

This application claims priority to Japanese Patent Application No. 2020-209510 filed on Dec. 17, 2020, incorporated herein by reference in its entirety.

BACKGROUND

1. Technical Field

The present disclosure relates to a motor attachment structure for an electric vehicle.

2. Description of Related Art

An electric vehicle described in Japanese Unexamined Patent Application Publication No. 2010-252584 (JP 2010-252584 A) is obtained such that a motor is attached to a vehicle by removing an internal combustion engine originally provided in the vehicle as a drive source for the vehicle. The electric vehicle includes a motor case in which the motor is accommodated. The motor case is placed at a position where the internal combustion engine used to be provided.

SUMMARY

In a case where the motor is used by replacing the internal combustion engine with the motor like JP 2010-252584 A, the shape and the dimension of a motor case that can be employed are determined to some extent for placing the motor case at the position where the internal combustion engine used to be placed. Meanwhile, there are various types of motors. Such various types of motors can have different shapes and different dimensions of the motors. When the type of a motor that can be accommodated in the motor case is restricted due to restriction on the motor case, a motor of an appropriate type may not be able to be provided in a vehicle.

In order to solve the above problems, a motor attachment structure for an electric vehicle includes a motor, a tubular bearing, a case, and an attachment. The motor includes a tubular rotor configured to rotate together with an output shaft in an integrated manner, and a tubular stator placed radially outwardly from the rotor when the stator is viewed from the output shaft. The tubular bearing is configured to rotatably support the output shaft or a rotating body configured to rotate together with the output shaft in an integrated manner. The motor and the bearing are accommodated in the case. The attachment is attached to the case. The attachment supports an outer peripheral surface of the bearing.

The diameter of the output shaft and the dimension of the output shaft in the direction along its central axis may vary depending on variations in the diameter of the rotor and in the dimension of the rotor in the direction along its central axis in accordance with the type of the motor. On this account, depending on the type of the motor, the arrangement of the output shaft inside the case such as a distance between a wall surface of the case and the output shaft may vary, for example. When the arrangement of the output shaft inside the case varies, a position at which the output shaft should be supported inside the case also varies. In the above configuration, even in a case where the position at which the output shaft should be supported varies depending on the type of the motor, when an appropriate attachment is employed from among a plurality of prepared attachments, the bearing can be supported at a position suitable for the type of the motor. Accordingly, even in a case where the configuration of the case cannot be changed, various types of motors can be accommodated in the case.

In the motor attachment structure, the attachment may include a plate-shaped main body portion placed at a position facing the motor in a direction along the central axis of the output shaft. The main body portion may have a through-hole penetrating through the attachment in the direction along the central axis of the output shaft. An inner surface of the through-hole may support an outer peripheral surface of the bearing.

In the above configuration, even in a case where the outside diameter of a bearing to be required is changed in accordance with the type of the motor, when an attachment having a through-hole with a diameter suitable for the outside diameter of the bearing is employed, the bearing can be supported at a necessary position. Accordingly, without requiring any complicated structure for the attachment, the bearing can be supported at a position required per type of the motor.

In the motor attachment structure, the attachment may support an outer peripheral surface of the stator. In this configuration, the bearing and the stator are both supported by the attachment. Accordingly, it is not necessary to separately prepare a configuration for supporting a stator.

In the motor attachment structure, the attachment may include a projecting portion projecting from the main body portion toward the motor. The projecting portion may have a tubular shape and may be placed such that the central axis of the projecting portion coincides with the central axis of the output shaft. An inner peripheral surface of the projecting portion may support an outer peripheral surface of the stator.

In the above configuration, even in a case where the outside diameter of the stator is changed in accordance with the type of the motor, when an attachment including a projecting portion with an inside diameter suitable for the outside diameter of the stator is employed, the stator can be supported at a necessary position. Accordingly, without requiring any complicated structure for the attachment, the stator can be supported at a position required per type of the motor.

In the motor attachment structure, the case may include a terminal block to which a power supply line placed outside the case is connected. The stator may include a bus bar via which a current is applied to the stator, and an intermediate bus bar via which the bus bar is connected to the terminal block.

Depending on the type of the motor, the position of the bus bar of the stator inside the case may vary. Even in this case, when the intermediate bus bar is provided like the above configuration, the terminal block can be connected to the bus bar of the stator without changing the position of the terminal block in the case.

The motor attachment structure may further include: a connecting shaft placed adjacent to the output shaft in a direction along a central axis of the output shaft such that a central axis of the connecting shaft coincides with the central axis of the output shaft; and a clutch configured to switch between transmission and non-transmission of torque between the output shaft and the connecting shaft. The clutch may be integrally attached to the motor.

Some types of hybrid vehicles using an internal combustion engine and a motor as drive sources are configured such that an output shaft of the internal combustion engine is connected to an output shaft of the motor via a clutch. The motor of such types of the hybrid vehicles is configured such that the clutch is integrally attached to the motor. Even in a case where such a motor is reused for an electric vehicle, it is possible to support the motor at an appropriate position with the attachment structure using the attachment.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
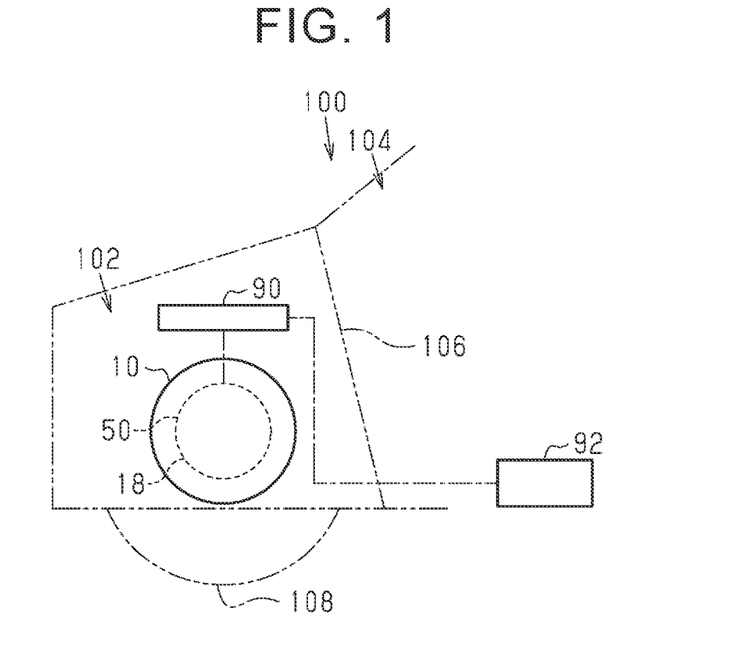
FIG. 1 is a schematic configuration diagram of an electric vehicle.

With reference to the drawings, the following will describe one embodiment of an electric vehicle to which a motor attachment structure for an electric vehicle is applied.
Schematic Configuration of Electric Vehicle As illustrated in FIG. 1, an electric vehicle 100 includes a motor room 102, a dash panel 106, and a vehicle cabin 104. The motor room 102 is a space defined in a front-side part in the electric vehicle 100. The dash panel 106 is a wall portion defining a rear end in the motor room 102. The vehicle cabin 104 is a space defined on a side opposite to the motor room 102 across the dash panel 106. The vehicle cabin 104 is a ride space for an occupant.

Figure 2:
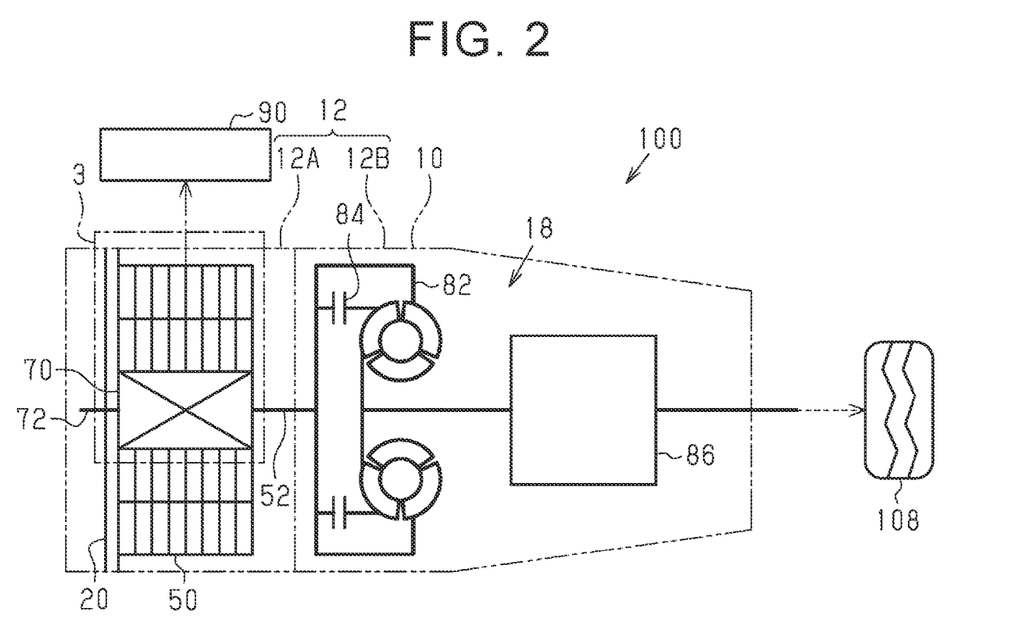
FIG. 2 is a schematic view illustrating a connecting mode of a drive mechanism inside a case.

The electric vehicle 100 includes a case 10, a drive mechanism 18, and driving wheels 108. The case 10 is placed inside the motor room 102. The case 10 is made of aluminum alloy, for example. As illustrated in FIG. 2, the case 10 includes a case main body 12. Further, the case main body 12 includes a first case main body 12A and a second case main body 12B. The first case main body 12A has a bottomed tubular shape as a whole. The second case main body 12B also has a bottomed tubular shape as a whole. The first case main body 12A and the second case main body 12B are integrally connected to each other in a state where their respective openings are brought into contact with each other. As a result, the case main body 12 as a whole has a columnar shape in which a space is defined. In the following description, in terms of the case main body 12, in a case where these two parts constituting the case main body 12 are described individually, the two parts are described as the first case main body 12A and the second case main body 12B, and in a case where the two parts are collectively described, they are described as the case main body 12.

The drive mechanism 18 is placed inside the case main body 12. The drive mechanism 18 includes a connecting shaft 72, a clutch 70, a motor generator 50, a torque converter 82, and a transmission mechanism 86. These members are arranged in a direction along the central axis of the case main body 12 basically in the above order. Only the clutch 70 and the motor generator 50 are placed at the same position in the direction along the central axis of the case main body 12. Details of a structure around the motor generator 50 will be described later. Note that the connecting shaft 72, the clutch 70, and the motor generator 50 are placed inside the first case main body 12A. The torque converter 82 and the transmission mechanism 86 are placed inside the second case main body 12B.

Schematic connecting modes and basic functions of the members of the drive mechanism 18 are as follows. The connecting shaft 72 is connected to an output shaft (hereinafter referred to as a motor output shaft) 52 of the motor generator 50 via the clutch 70. The clutch 70 switches between transmission and non-transmission of torque between the connecting shaft 72 and the motor output shaft 52. The motor generator 50 is a generator motor and serves as a drive source for the electric vehicle 100. The motor output shaft 52 is connected to an input shaft of the torque converter 82. The torque converter 82 is a hydraulic coupling. The torque converter 82 switches between transmission and non-transmission of torque between the input shaft of the torque converter 82 and an output shaft thereof. Note that the torque converter 82 includes a lock-up clutch 84. The lock-up clutch 84 switches between mechanical connection and non-connection between the input shaft and the output shaft of the torque converter 82. The output shaft of the torque converter 82 is connected to an input shaft of the transmission mechanism 86. The transmission mechanism 86 changes a speed ratio in multi-stages, the speed ratio being a difference in rotation speed between the input shaft and the output shaft of the transmission mechanism 86. The transmission mechanism 86 outputs a torque corresponding to the speed ratio. The output shaft of the transmission mechanism 86 penetrates through the case main body 12 and reaches outside of the case main body 12. The output shaft of the transmission mechanism 86 is connected to the driving wheels 108 via a differential. The differential allows the right and left driving wheels 108 to have a difference in rotation speed. Note that the differential is not illustrated in FIG. 2.

Detailed Structure around Motor Generator

A structure of the motor generator 50 is described together with structures of the clutch 70 and the connecting shaft 72 placed around the motor generator 50. Note that the motor generator 50 includes a rotor 54, a stator 60, and a rotating body 56 in addition to the motor output shaft 52. Further, the electric vehicle 100 includes a bearing 78 as an attached component of the motor generator 50.

Figure 3:
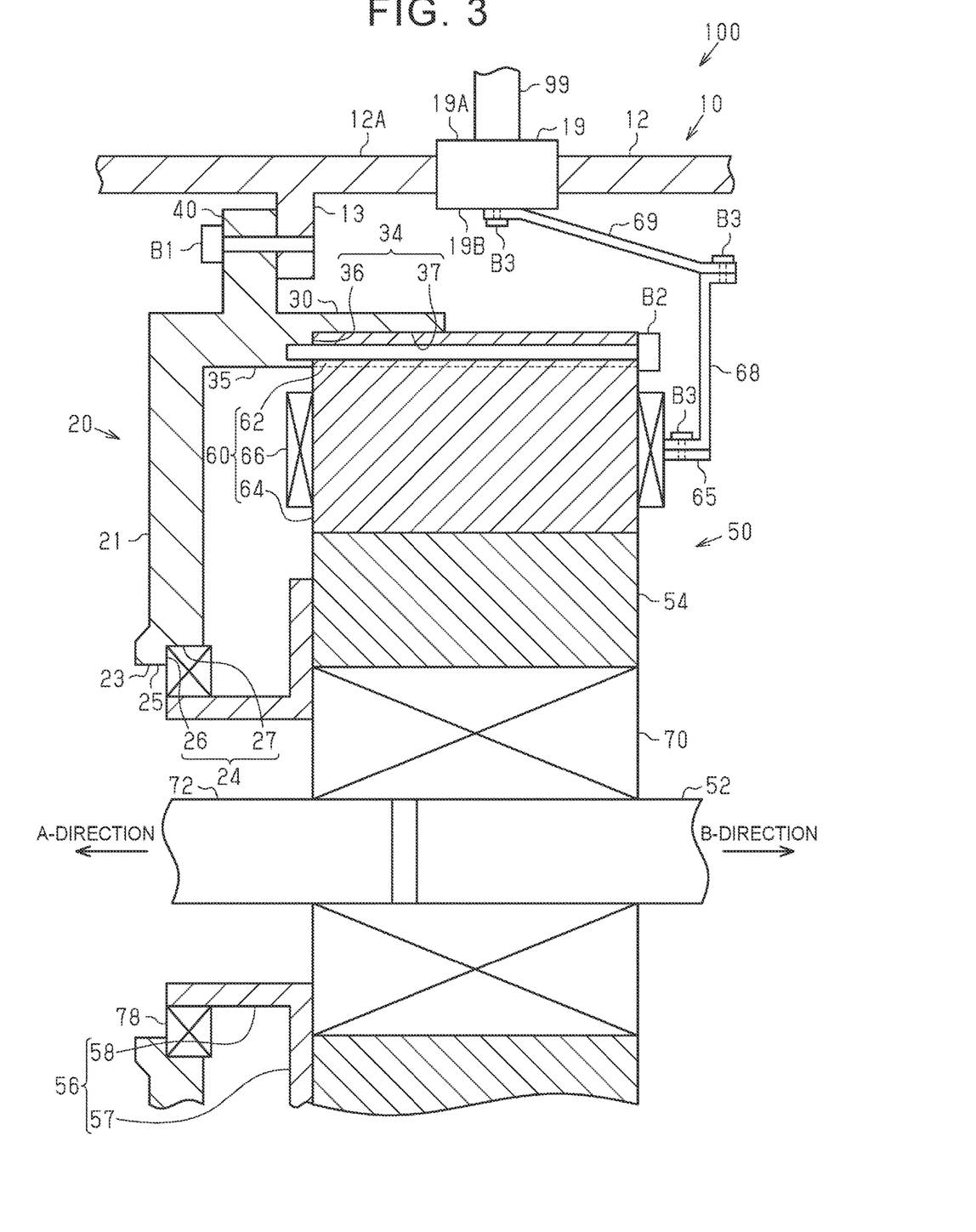
FIG. 3 is a sectional view illustrating a region 3 in FIG. 2 in an enlarged manner.

As illustrated in FIG. 3, the connecting shaft 72 has a bar shape. The motor output shaft 52 also has a bar shape. The connecting shaft 72 and the motor output shaft 52 are held by the clutch 70 at positions adjacent to each other on the same axis. Although detailed illustration is omitted in FIG. 3, the clutch 70 has a well-known structure including, for example, a friction plate, a piston, a hub, and a drum, and the clutch 70 has a tubular shape as a whole. The central axis of the clutch 70 coincides with the central axes of the connecting shaft 72 and the motor output shaft 52. When the clutch 70 is viewed from the central axes of the connecting shaft 72 and the motor output shaft 52, the clutch 70 is placed radially outwardly from the connecting shaft 72 and the motor output shaft 52. Hereinafter, in the direction along the central axes of the connecting shaft 72 and the motor output shaft 52, a direction directed toward the connecting shaft 72 from the motor output shaft 52 is referred to as an A-direction, and a direction directed toward the motor output shaft 52 from the connecting shaft 72 is referred to as a B-direction.

The rotor 54 has a tubular shape. The inside diameter of the rotor 54 is larger than the outside diameter of the clutch 70. The central axis of the rotor 54 coincides with the central axis of the clutch 70. The rotor 54 is placed radially outwardly from the clutch 70 when the rotor 54 is viewed from the central axis of the rotor 54. That is, the rotor 54 surrounds the clutch 70. An inner peripheral surface of the rotor 54 is fixed to the clutch 70. The rotor 54 is connected to the motor output shaft 52 via a component part of the clutch 70. The rotor 54 rotates together with the motor output shaft 52 in an integrated manner.

The stator 60 includes a stator main body 62, a plurality of teeth 64, and a coil 66. The stator main body 62 has a tubular shape. The inside diameter of the stator main body 62 is larger than the outside diameter of the rotor 54. The central axis of the stator main body 62 coincides with the central axis of the rotor 54. The stator main body 62 is placed radially outwardly from the rotor 54 when the stator main body 62 is viewed from the central axis of the stator main body 62. That is, the stator main body 62 surrounds the rotor 54.

The teeth 64 project from an inner peripheral surface of the stator main body 62. The teeth 64 are arranged at regular intervals in the circumferential direction of the stator main body 62. A gap is formed between projecting ends of the teeth 64 and an outer peripheral surface of the rotor 54. Note that the gap is not illustrated in FIG. 3.

The coil 66 is wound around the teeth 64. The coil 66 is partially placed outwardly from the opposite end surfaces of the stator main body 62. The rotating body 56 includes a base portion 57 and an extension portion 58. The base portion 57 has an annular plate shape. The central axis of the base portion 57 coincides with the central axis of the rotor 54. An outer peripheral side part of the base portion 57 is fixed to an end surface, on the A-direction side, of the rotor 54. The base portion 57 rotates together with the rotor 54 in an integrated manner. That is, the rotating body 56 rotates together with the motor output shaft 52 in an integrated manner.

The extension portion 58 projects to the A-direction from a surface of the base portion 57, the surface being opposite to a surface fixed to the rotor 54. The extension portion 58 has a tubular shape. The extension portion 58 is placed in an inner peripheral side part of the base portion 57. The central axis of the extension portion 58 coincides with the central axis of the base portion 57. The inside diameter of the extension portion 58 is larger than the diameter of the connecting shaft 72.

Although not illustrated in FIG. 3, the bearing 78 has a well-known structure in which a plurality of rolling elements is provided between an annular outer ring and an annular inner ring. The bearing 78 has a tubular shape as a whole. In the following description, an inner peripheral surface of the inner ring is referred to as an inner peripheral surface of the bearing 78, and an outer peripheral surface of the outer ring is referred to as an outer peripheral surface of the bearing 78. The bearing 78 is fitted to an outer peripheral surface of the extension portion 58 in the rotating body 56.

Attachment

The electric vehicle 100 includes an attachment 20 inside the case main body 12. The attachment 20 is a member via which the motor generator 50 is attached to the case main body 12. The following first describes a configuration of the attachment 20 and then describes an attachment structure of the motor generator 50 via the attachment 20.

The attachment 20 includes a main body portion 21, a projecting portion 30, and a plurality of attachment portions 40. The attachment 20 is made of aluminum alloy, for example. The main body portion 21 has a round plate shape. The main body portion 21 has a through-hole 23 opened on the opposite surfaces of the main body portion 21. An inner surface of the through-hole 23 includes a main body small-diameter portion 25 and a main body large-diameter portion 27 having a diameter larger than that of the main body small-diameter portion 25. The main body small-diameter portion 25 and the main body large-diameter portion 27 are adjacent to each other. That is, the inner surface of the through-hole 23 is a stepped shape. Respective central axes of the main body small-diameter portion 25 and the main body large-diameter portion 27 coincide with each other. The diameter of the main body small-diameter portion 25 is larger than the outside diameter of the extension portion 58 of the rotating body 56. The diameter of the main body large-diameter portion 27 is generally the same as the outside diameter of the bearing 78. The main body large-diameter portion 27 and a main body stepped surface 26 as a stepped surface between the main body small-diameter portion 25 and the main body large-diameter portion 27 constitute a bearing support portion 24.

The projecting portion 30 projects from the main body portion 21. More specifically, the projecting portion 30 projects from a surface on which the main body large-diameter portion 27 is opened, out of the opposite surfaces of the main body portion 21. The projecting portion 30 has a tubular shape. The central axis of the projecting portion 30 coincides with the central axis of the through-hole 23. An inner peripheral surface of the projecting portion 30 includes a projecting small-diameter portion 35 and a projecting large-diameter portion 37 having a diameter larger than that of the projecting small-diameter portion 35. The projecting small-diameter portion 35 and the projecting large-diameter portion 37 are adjacent to each other. That is, the inner peripheral surface of the projecting portion 30 is a stepped shape. Respective central axes of the projecting small-diameter portion 35 and the projecting large-diameter portion 37 coincide with each other. The projecting large-diameter portion 37 is placed on a distal end side of the projecting portion 30 from the projecting small-diameter portion 35. The diameter of the projecting small-diameter portion 35 is generally the same as the inside diameter of the stator main body 62. The diameter of the projecting large-diameter portion 37 is generally the same as the outside diameter of the stator main body 62. The projecting large-diameter portion 37 and a projecting stepped surface 36 as a stepped surface between the projecting small-diameter portion 35 and the projecting large-diameter portion 37 constitute a stator support portion 34.

The attachment portions 40 project from an outer peripheral surface of the projecting portion 30. The attachment portions 40 are arranged at regular intervals in the circumferential direction of the attachment 20. Each of the attachment portions 40 has a rectangular plate shape. Note that the case 10 includes a plurality of case attachment portions 13 as a structure portion to which the attachment 20 is attached. The case attachment portions 13 are placed in an end part of the first case main body 12A in the direction along the central axis of the case main body 12. The case attachment portions 13 project from the inner peripheral surface of the first case main body 12A. The case attachment portions 13 are arranged at regular intervals in the circumferential direction of the first case main body 12A. Each of the case attachment portions 13 has a rectangular plate shape.

Attachment Structure of Motor Generator

The motor generator 50 is attached to the attachment 20. In a state where the motor generator 50 is attached to the attachment 20, the main body portion 21 of the attachment 20 faces the motor generator 50 in a direction along the central axis of the motor generator 50. The main body portion 21 is placed on the A-direction side from the motor generator 50. The central axis of the through-hole 23 of the main body portion 21 coincides with the central axis of the motor generator 50. The projecting portion 30 projects toward the motor generator 50. That is, out of the projecting small-diameter portion 35 and the projecting large-diameter portion 37, the projecting large-diameter portion 37 is placed closer to the motor generator 50 than the projecting small-diameter portion 35. Similarly, out of the main body small-diameter portion 25 and the main body large-diameter portion 27 of the through-hole 23, the main body large-diameter portion 27 is placed closer to the motor generator 50 than the main body small-diameter portion 25.

In the arrangement of the attachment 20, the bearing 78 is fitted to the bearing support portion 24 constituted by the through-hole 23 of the attachment 20. The bearing support portion 24 supports the bearing 78. That is, the main body large-diameter portion 27 supports an outer peripheral surface of the bearing 78. Further, the main body stepped surface 26 supports an end surface of the outer ring of the bearing 78. Note that the bearing 78 rotatably supports the extension portion 58 of the rotating body 56 in a state where the bearing 78 is supported by the bearing support portion 24.

Further, in the arrangement of the attachment 20, a part, of the stator 60, that is closer to the attachment 20, that is, an A-direction side part of the stator 60 is fitted to the stator support portion 34 constituted by the projecting portion 30 of the attachment 20. The stator support portion 34 supports the stator 60. That is, the projecting large-diameter portion 37 supports an outer peripheral surface of the stator main body 62. Further, the projecting stepped surface 36 supports the end surface of the stator main body 62.

Note that a plurality of bolts B2 penetrates through the stator main body 62. Each of the bolts B2 penetrates through the whole stator main body 62 in a direction along the central axis of the stator main body 62. More specifically, each of the bolt B2 is passed through the stator main body 62 toward the A-direction from the B-direction side that is opposite to the projecting stepped surface 36. Each of the bolts B2 reaches a thick part of the projecting portion 30. Each of the bolts B2 fixes the attachment 20 to the motor generator 50 in an integrated manner. Note that only one of the bolts B2 is illustrated in FIG. 3.

The attachment 20 to which the motor generator 50 is attached is attached to the case main body 12 via the case attachment portions 13. More specifically, in a state where the attachment 20 is attached to the case main body 12, the attachment portions 40 of the attachment 20 face the case attachment portions 13. A bolt B1 penetrates through the attachment portion 40 and the case attachment portion 13 facing each other. The bolt B1 fixes the attachment portion 40 to the case attachment portion 13 in an integrated manner.
Electrical Connection Structure of Motor Generator As illustrated in FIG. 1, the electric vehicle 100 includes an inverter 90 and a battery 92. The battery 92 is electrically connected to the motor generator 50 via the inverter 90. The battery 92 supplies electric power to the motor generator 50 and stores electric power supplied from the motor generator 50. The battery 92 is placed under the floor of the vehicle cabin 104. The inverter 90 performs power conversion from direct current to alternating current and vice versa between the battery 92 and the motor generator 50. The inverter 90 is placed inside the motor room 102.

An electric system from the inverter 90 to the motor generator 50 will be described in detail. The case 10 includes a terminal block 19. The terminal block 19 is a power relaying machine. As illustrated in FIG. 3, the terminal block 19 is placed in the first case main body 12A. The terminal block 19 penetrates through a peripheral wall of the first case main body 12A. The terminal block 19 is placed near the case attachment portions 13 in the direction along the central axis of the case main body 12. A part of the terminal block 19, the part being exposed outside the case main body 12, constitutes a first connecting portion 19A for cable connection. A part of the terminal block 19, the part being exposed inside the case main body 12, constitutes a second connecting portion 19B for bus bar connection.

The electric vehicle 100 includes a power cable 99. The power cable 99 is a power supply line via which electric power is transmitted between the inverter 90 and the motor generator 50. The power cable 99 is placed outside the case 10. A first end of the power cable 99 is electrically connected to the inverter 90. A second end of the power cable 99 is electrically connected to the first connecting portion 19A of the terminal block 19 in the case 10.

The stator 60 includes a connection mechanism 65 and a bus bar 68. The connection mechanism 65 is electrically connected to the coil 66. More specifically, the connection mechanism 65 is connected to the coil 66 projecting from an end surface, on the B-direction side, of the stator main body 62. The bus bar 68 has a band plate shape. The bus bar 68 is a conductive material via which a current is applied to the coil 66. A first end of the bus bar 68 is electrically connected to the connection mechanism 65. The first end of the bus bar 68 is fixed to the connection mechanism 65 by a bolt B3. A second end of the bus bar 68 is placed radially outwardly from the stator main body 62 when the bus bar 68 is viewed from the central axis of the stator main body 62.

The electric vehicle 100 includes an intermediate bus bar 69 inside the case main body 12. The intermediate bus bar 69 has a band plate shape. The intermediate bus bar 69 is a conductive material via which a current is relayed between the bus bar 68 and the terminal block 19. A first end of the intermediate bus bar 69 is electrically connected to the bus bar 68 of the stator 60. More specifically, the first end of the intermediate bus bar 69 is fixed, by a bolt B3, to an end part of the bus bar 68 of the stator 60, the end part being opposite to the connection mechanism 65. A second end of the intermediate bus bar 69 is electrically connected to the terminal block 19 of the case 10. More specifically, the second end of the intermediate bus bar 69 is fixed to the second connecting portion 19B of the terminal block 19 by a bolt B3.

Operation of Embodiment

As the operation of the embodiment, the following describes an attachment method for attaching the motor generator 50 to the case 10.

As the motor generator 50, a motor generator originally provided in another vehicle is reused. Another vehicle as used herein is a hybrid vehicle using an internal combustion engine and a motor generator as drive sources. As one type of the hybrid vehicle, there is a hybrid vehicle including an internal combustion engine and one motor generator. In the hybrid vehicle of this type, a crankshaft as an output shaft of the internal combustion engine may be connected to an output shaft of the motor generator via a clutch in some cases. The motor generator in this case includes the clutch inside a rotor. The motor generator attached to the electric vehicle 100 is a motor generator of this type. The crankshaft of the internal combustion engine used to be connected to the connecting shaft 72 held by the clutch 70. That is, the clutch used to be provided between the output shaft of the motor generator and the crankshaft so as to function to switch between transmission and non-transmission of torque between the output shaft of the motor generator and the crankshaft.

Now, in order to attach the motor generator 50 to the electric vehicle 100, the following members are prepared in advance.
Motor Generator 50
Bearing 78
Attachment 20
Intermediate Bus Bar 69
Case 10

The motor generator 50 is prepared by being removed from the hybrid vehicle in advance. As described above, the motor generator 50 includes the clutch 70 and the connecting shaft 72 in an integrated manner with the motor generator 50.

The bearing 78 may be remove from the hybrid vehicle together with the motor generator 50, or a bearing having a dimension suitable for the outside diameter of the extension portion 58 of the rotating body 56 may be prepared separately as the bearing 78. As the attachment 20, an attachment suitable for the motor generator 50 to be reused is prepared. At the time when the attachment 20 is prepared, the projecting portion 30 is designed so that the projecting portion 30 fits the outside diameter of the stator 60 and is placed at an optimum position for supporting the stator 60. Further, the through-hole 23 is designed so that the through-hole 23 fits the outside diameter of the bearing 78 and is placed at an optimum position for supporting the bearing 78.

As the intermediate bus bar 69, an intermediate bus bar having a dimension corresponding to the distance between the terminal block 19 and the bus bar 68 of the stator 60 is prepared.

The case 10 is prepared in a state where the first case main body 12A and the second case main body 12B are separated from each other. The torque converter 82 and the transmission mechanism 86 are accommodated inside the second case main body 12B. Note that the first case main body 12A and the second case main body 12B are not newly designed so that they fit the motor generator 50 to be reused. The first case main body 12A and the second case main body 12B have common specifications also usable for other electric vehicles.

When those members are prepared, an attachment operation to attach the motor generator 50 is performed. First, the bearing 78 and the motor generator 50 are attached to the attachment 20. That is, the bearing 78 is placed at the bearing support portion 24 of the attachment 20. Further, the stator 60 is placed in the stator support portion 34 of the attachment 20. In this state, the stator 60 is fixed to the attachment 20 by the bolts B2.

Subsequently, the attachment 20 is attached to the case main body 12. That is, the attachment portions 40 of the attachment 20 and the case attachment portions 13 are aligned and fixed to each other by the bolts B1. Note that a bottom portion of the first case main body 12A having a bottomed tubular shape is detachable from a tubular portion of the first case main body 12A. At the time when the attachment 20 is attached to the case main body 12, the attachment 20 is attached to the first case main body 12A in a state where the bottom portion is detached from the tubular portion, and after that, the bottom portion is attached to the tubular portion. After the attachment 20 is attached to the case main body 12, the intermediate bus bar 69 is attached to the bus bar 68 of the stator 60 and the terminal block 19. That is, the intermediate bus bar 69 is fixed to the bus bar 68 and the terminal block 19 by the bolts B3. After that, various adjustment operations are performed, and then, the first case main body 12A and the second case main body 12B are connected to each other integrally. Note that the various adjustment operations are, for example, connection between the motor output shaft 52 and the input shaft of the torque converter 82. Through such a process, the motor generator 50 can be attached to the case 10 via the attachment 20. Note that, in the present embodiment, since the torque converter 82 is rotatably supported by an exclusive bearing, the motor output shaft 52 is supported rotatably together with the input shaft of the torque converter 82. Accordingly, the motor output shaft 52 is supported rotatably through the adjustment operations.

Effects of Embodiment (1) In a case where the motor generator used in another vehicle is reused, the type of the motor generator varies depending on the type of the vehicle to which the motor generator used to be attached. When the type of the motor generator varies, the diameter and the dimension of the motor generator vary. Accordingly, when the motor generator 50 to be reused is accommodated in the case 10, the arrangement of the motor generator 50 inside the case 10 varies depending on the type of the motor generator 50 to be reused. On this account, an attachment structure suitable for each type of the motor generator 50 to be reused is required.

In order to satisfy the requirement, it is conceivable that the structure of the case 10 is changed for each type of the motor generator 50 to be reused. However, the case 10 occupies a markedly large volume in the motor room 102, and its dimension is considerably large. On that account, the dimension of a metal die to be used for manufacturing the case 10 is also considerably large. In a case where the dimension of the metal die is large, it requires a considerable cost to correct the shape of the metal die or to prepare a new metal die. Accordingly, if the design of the case 10 is to be changed, it causes a considerable increase in cost. Further, there is also a restriction on an accommodation space for the case 10 in the motor room 102. From these points, it is demanded to use a commonly usable case as the case 10 regardless of the type of the motor generator 50 to be reused.

Meanwhile, the attachment 20 used in the present embodiment should have a dimension that allows the attachment 20 to connect the motor generator 50 to a wall surface of the case 10, and the dimension of the attachment 20 is smaller than that of the case 10. On this account, even in a case where the shape of a metal die for the attachment 20 is modified or a new metal die is prepared in accordance with the change of the design of the attachment 20, the attachment 20 does not cause such a large increase in cost. The present embodiment employs an attachment structure using the attachment 20 that can be expected to be changed in design at a low cost. The attachment 20 suitable for the shape of the motor generator 50 to be reused is prepared, and the motor generator 50 is attached to the case 10 via the attachment 20. Accordingly, the motor generator 50 can be attached to the case 10 the shape and the dimension of which are determined in advance, without causing an increase in cost.

(2) The diameter of the extension portion 58 of the rotating body 56 and the dimension of the extension portion 58 in the direction along its central axis vary depending on variations in the diameter of the rotor 54 and in the dimension of the rotor 54 in the direction along its central axis along with the type of the motor generator 50. On this account, a position where the extension portion 58 should be supported inside the case main body 12 varies depending on the type of the motor generator 50 to be reused. For example, the position where the extension portion 58 should be supported is set to be closer to or farther from an inner peripheral wall of the case main body 12 depending on the magnitude of the outside diameter of the extension portion 58. Further, for example, the position where the extension portion 58 should be supported is set to be closer to or farther from an end surface of the case main body 12 depending on the magnitude of the dimension of the extension portion 58 in the direction along its central axis.

In the present embodiment, the bearing support portion 24 is designed to a dimension suitable for the bearing 78 of the motor generator 50 to be reused. Further, the bearing support portion 24 is designed such that the bearing support portion 24 can be placed at a position suitable for the bearing 78 of the motor generator 50 to be reused. By use of the bearing support portion 24 configured as such, the bearing 78 can be supported at an appropriate position suitable for the type of the motor generator 50 inside the case 10 the shape and the dimension of which are determined in advance. Besides, the attachment 20 supports the outer peripheral surface of the bearing 78 by the main body large-diameter portion 27 and also supports the end surface of the bearing 78 by the main body stepped surface 26. Accordingly, in the present embodiment, the bearing 78 can be also supported stably at an appropriate position.

(3) In the present embodiment, the bearing support portion 24 is constituted by the inner surface of the through-hole 23 of the attachment 20. In the present embodiment, with such a very simple and easy configuration of the through-hole 23, the bearing 78 can be supported at an appropriate position inside the case 10 the shape and the dimension of which are determined in advance. Further, in a case where the bearing support portion 24 is constituted by the inner surface of the through-hole 23, even when the diameter of the motor output shaft 52 is changed in accordance with the type of the motor generator 50 to be reused, the dimension of the diameter of the main body large-diameter portion 27 is just changed in accordance with the outside diameter of the bearing 78 on preparing the attachment 20. On this account, it does not take effort to design the attachment 20 in accordance with the type of the motor generator 50.

(4) The diameter of the stator 60 and the dimension of the stator 60 in the direction along its central axis vary depending on variations in the type of the motor generator 50. On this account, similarly to the extension portion 58, the position where the stator 60 should be supported inside the case main body 12 varies depending on the type of the motor generator 50 to be reused.

In the motor generator 50, it is preferable that the dimension of a gap between the rotor 54 and the projecting ends of the teeth 64 in the stator 60 be uniform over the whole circumference of the motor generator 50. The attachment 20 of the present embodiment includes the stator support portion 34 in addition to the bearing support portion 24. The stator support portion 34 is designed to a dimension suitable for the stator 60 of the motor generator 50 to be reused. Further, the stator support portion 34 is designed such that the stator support portion 34 can be placed at a position suitable for the stator 60 of the motor generator 50 to be reused. By use of the stator support portion 34 configured as such, the stator 60 can be supported at an appropriate position suitable for the type of the motor generator 50 inside the case 10 the shape and the dimension of which are determined in advance. Besides, similarly to (2) described above, the stator support portion 34 supports the outer peripheral surface of the stator main body 62 by the projecting large-diameter portion 37 and also supports the end surface of the stator main body 62 by the projecting stepped surface 36. Hereby, the stator support portion 34 can support the stator 60 stably at an appropriate position. When the motor generator 50 is supported by the stator support portion 34 together with the bearing support portion 24, it is possible to maintain an optimum positional relationship between the motor output shaft 52 and the stator 60, that is, an optimum positional relationship between the rotor 54 and the stator 60 inside the case 10 the shape and the dimension of which are determined in advance.

(5) In the present embodiment, the stator support portion 34 is constituted by the inner peripheral surface of the tubular projecting portion 30. In the present embodiment, with such a very simple and easy configuration of the tubular projecting portion 30, the stator 60 can be supported at an appropriate position inside the case 10 the shape and the dimension of which are determined in advance. Further, in a case where the stator support portion 34 is constituted by the tubular projecting portion 30, even when the diameter of the stator 60 is changed in accordance with the type of the motor generator 50 to be reused, the dimension of the diameter of the projecting large-diameter portion 37 is just changed in accordance with the outside diameter of the stator 60 on preparing the attachment 20. On this account, it does not take effort to design the attachment 20 in accordance with the type of the motor generator 50.

(6) The position of the terminal block 19 in the case 10 is determined in advance. Meanwhile, the position of the bus bar 68 of the stator 60 inside the case 10 varies depending on variations in the diameter of the stator 60 and in the dimension of the stator 60 in the direction along its central axis due to the type of the motor generator 50 to be reused.

In the present embodiment, the length of the intermediate bus bar 69 is designed to a dimension corresponding to the distance between the terminal block 19 and the bus bar 68 of the stator 60. When the terminal block 19 is connected to the bus bar 68 of the stator 60 by use of the intermediate bus bar 69, the bus bar 68 of the stator 60 can be surely connected to the terminal block 19 inside the case 10 in which the position of the terminal block 19 is determined in advance. At the time when the motor generator 50 is placed inside the case 10, it is not necessary to replace the bus bar 68.

Modification

The present embodiment can be also carried out by adding changes as stated below. The present embodiment and the following modifications can be carried out in combination as long as they do not cause any technical inconsistencies.

The material of the case 10 is not limited to the example in the above embodiment. As the material of the case 10, an appropriate material on accommodating the members of the drive mechanism 18 inside the case 10 should be employed. In consideration of the weights of the members of the drive mechanism 18, a material having a suitable rigidity is preferable. Further, in consideration that the members of the drive mechanism 18 generate heat, it is preferable that the material have an excellent heat dissipation property.

The material of the attachment 20 is not limited to the example in the above embodiment. As the material of the attachment 20, an appropriate material on attaching the motor generator 50 to the case main body 12 should be employed. Similarly to the modification for the material of the case 10, an appropriate material should be employed from the viewpoint of rigidity and a heat dissipation property, for example. Further, the material of the attachment 20 may be also the same material as the case 10 or may be different from the material of the case 10. Note that the attachment 20 is a part of a heat transmission path from the motor generator 50 to the case 10. From this viewpoint, the material of the attachment 20 should be a material having a heat conduction efficiency equal to or more than that of the case 10.

The configuration of the stator support portion 34 is not limited to the example in the above embodiment. For example, instead of forming the stepped shape on the inner peripheral surface of the projecting portion 30, the inside diameter of the projecting portion 30 may be uniform over the overall length of the projecting portion 30. The stator support portion 34 may be constituted only by the inner peripheral surface of the projecting portion 30. In this case, for example, when the stator main body 62 is fitted by pressing to the inner peripheral surface of the projecting portion 30, the stator 60 can be supported stably.

The stator support portion 34 may not be provided. If the stator 60 can be supported by use of the existing configuration of the case main body 12, for example, the stator support portion 34 is not necessary.

The configuration of the bearing support portion 24 is not limited to the example in the above embodiment. Similarly to the modification of the stator support portion 34, for example, instead of forming the stepped shape on the inner surface of the through-hole 23, the diameter of the through-hole 23 may be uniform over the overall length of the through-hole 23. The bearing support portion 24 should have a shape that allows the bearing support portion 24 to support the outer peripheral surface of the bearing 78.

As described in the above modification, the shape of the attachment 20 is not limited to the example in the above embodiment. The attachment 20 should have a structure for supporting the bearing 78 and should be attached to the case 10.

Figure 4:
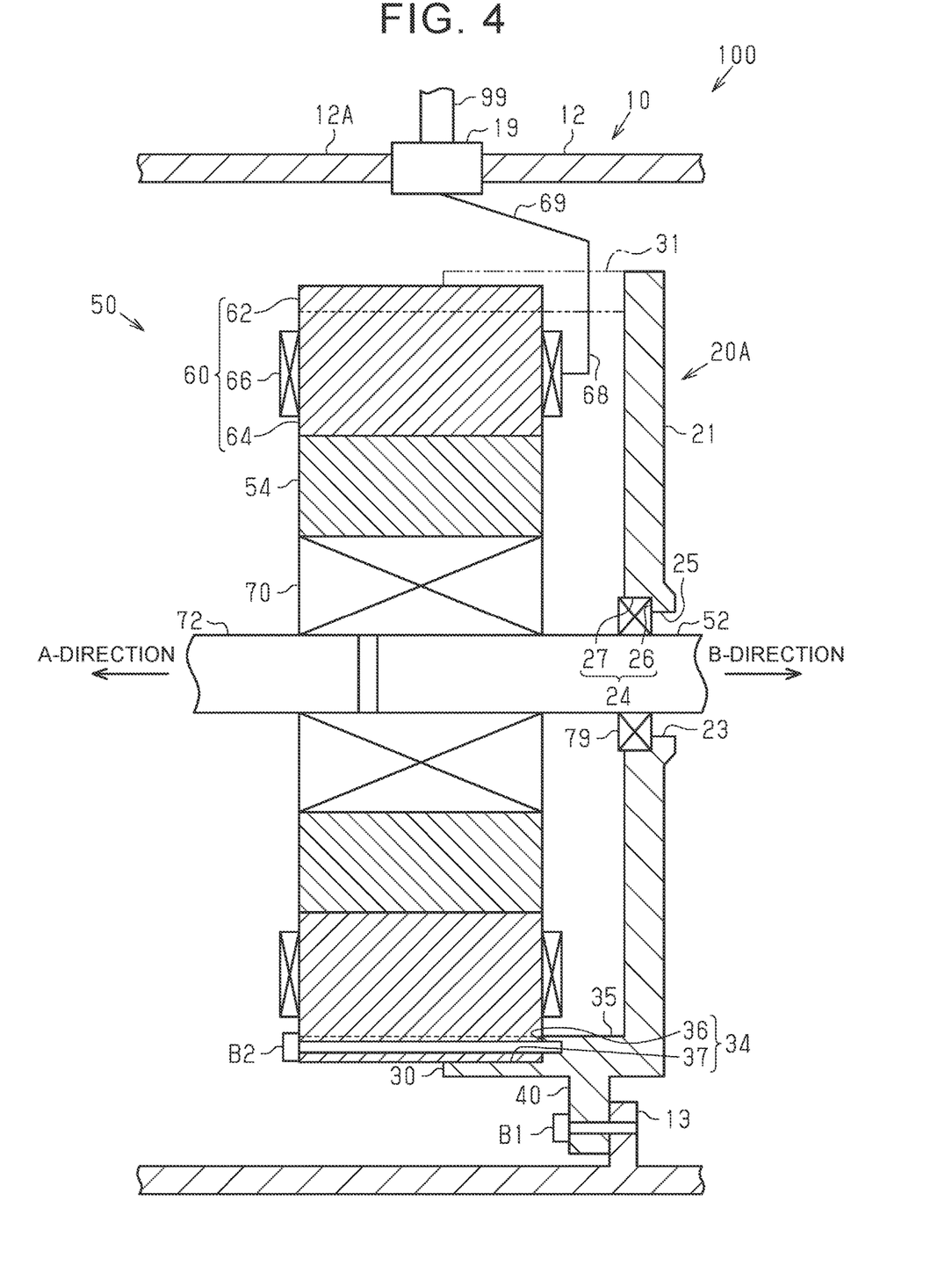
FIG. 4 is a diagrammatic view illustrating a modification of an attachment.

A target to be supported by the bearing support portion 24 may be also a bearing that rotatably supports the motor output shaft 52. One example of a case where such a structure is employed will be described with reference to FIG. 4. The example illustrated in FIG. 4 is different from the above embodiment in the following points. That is, instead of the rotating body 56, a bearing 79 for the motor output shaft 52 is provided. Further, the arrangement and the configuration of the attachment 20 are changed from those in the above embodiment. The following description mainly deals with these parts different from the above embodiment, and redundant descriptions that have been already described in the above embodiment are simplified or omitted. Note that, in FIG. 4, the same reference sign used in FIG. 3 is assigned to a part having the same function or substantially the same function as in FIG. 3.

As illustrated in FIG. 4, the electric vehicle 100 includes the bearing 79 for the motor output shaft 52 inside the case main body 12. The inside diameter of the bearing 79 is generally the same as the diameter of the motor output shaft 52. The bearing 79 is placed on the B-direction side from the motor generator 50. The bearing 79 is fitted to the motor output shaft 52.

The configuration of an attachment 20A is different from the above embodiment in the following points. The bearing support portion 24 is designed such that the bearing support portion 24 fits the bearing 79 for the motor output shaft 52. That is, the diameter of the main body large-diameter portion 27 is generally the same as the outside diameter of the bearing 79 for the motor output shaft 52. Further, the projecting portion 30 includes a notch 31 formed in part of the projecting portion 30 in its circumferential direction. That is, the projecting portion 30 is formed in an arcuate shape instead of being formed in an annular shape when the projecting portion 30 is viewed from the central axis of the projecting portion 30. The notch 31 extends over the opposite ends of the projecting portion 30 in a direction along the central axis of the projecting portion 30. The notch 31 is provided to avoid interference with the bus bar 68 in the stator 60.

In a state where the motor generator 50 is attached to the attachment 20A, the attachment 20A is placed on the B-direction side from the motor generator 50. Similarly to the above embodiment, the projecting portion 30 projects toward the motor generator 50. The attachment 20A is integrated with the motor generator 50 in a state where the attachment 20A is positioned such that the notch 31 of the projecting portion 30 and the bus bar 68 of the stator 60 are placed at the same position in the circumferential direction of the attachment 20A. The stator support portion 34 of the attachment 20A supports a B-direction side part of the outer peripheral surface of the stator main body 62 in a state where the stator support portion 34 avoids interference with the bus bar 68 of the stator 60.

Further, in a state where the motor generator 50 is attached to the attachment 20A, the bearing 79 for the motor output shaft 52 is placed in the bearing support portion 24. The bearing support portion 24 supports the bearing 79 for the motor output shaft 52. That is, the main body large-diameter portion 27 supports an outer peripheral surface of the bearing 79. Further, the main body stepped surface 26 supports an end surface of the bearing 79. Note that the bearing 79 rotatably supports the motor output shaft 52 in a state where the bearing 79 is supported by the bearing support portion 24. By employing such a structure, the bearing 79 for the motor output shaft 52 may be supported by the bearing support portion 24.

As described in the modification in FIG. 4, the positional relationship between the attachment 20 and the motor generator 50 is modifiable from the example in the above embodiment. The positional relationship between the attachment 20 and the motor generator 50 is not limited particularly, provided that the motor generator 50 can be attached to the case main body 12. The attachment 20 should be placed at an appropriate position in accordance with the position of the target to be supported. For example, depending on the structure of the motor generator 50, the rotating body 56 and the bearing 78 can be provided on the B-direction side from the motor generator 50. Further, the bearing 79 for the motor output shaft 52 can be provided on the A-direction side from the motor generator 50. The attachment 20 should be placed at an appropriate position in accordance with these arrangements.

The intermediate bus bar 69 is not essential. If the motor generator 50 can be placed at a position where the bus bar 68 of the stator 60 can be directly connected to the terminal block 19 of the case 10, the intermediate bus bar 69 is unnecessary.

The motor generator to be accommodated in the case is not limited to a motor generator of such a type that a clutch is provided inside the motor generator. For example, some hybrid vehicles use two motor generators as drive sources in addition to an internal combustion engine. The motor generators used in the hybrid vehicles of this type do not include a clutch. The motor generator of such a type may be attached to a case via an attachment. Even in this case, the attachment should be designed appropriately such that the motor generator can be attached to the case via the attachment.

In a case where the motor generators of such a hybrid vehicle are reused, it is conceivable that a two-motor drive mechanism constituted by a set of the two motor generators and a connecting mechanism via which the two motor generators are connected to each other is accommodated inside a case. In this case, the internal combustion engine is separated from the two motor generators and the connecting mechanism. The two-motor drive mechanism includes a first motor generator, a second motor generator, a first planetary gear mechanism connected to the first motor generator, and a second planetary gear mechanism connected to the second motor generator. Further, the two-motor drive mechanism includes an output shaft connected to the first planetary gear mechanism and the second planetary gear mechanism such that driving forces from the first motor generator and the second motor generator are transmitted to the output shaft. The first planetary gear mechanism includes a first sun gear, a first ring gear placed coaxially with the first sun gear, a first pinion gear meshing with the first sun gear and the first ring gear, and a first carrier configured to support the first pinion gear axially rotatably. The first sun gear is an external gear. The first ring gear is an internal gear. The second planetary gear mechanism includes a second sun gear, a second ring gear placed coaxially with the second sun gear, a second pinion gear meshing with the second sun gear and the second ring gear, and a second carrier configured to support the second pinion gear axially rotatably. The second sun gear is an external gear. The second ring gear is an internal gear. The first sun gear is connected to the first motor generator, and the first ring gear is connected to the output shaft. Further, the second sun gear is connected to the second motor generator, and the second ring gear is connected to the output shaft.

Note that, in the hybrid vehicle originally provided with the first carrier, a crankshaft of the internal combustion engine used to be connected to the first carrier. Due to a remnant from the time when the first carrier used to be connected to the crankshaft, a member provided between the first carrier and the crankshaft in the hybrid vehicle may be included in the two-motor drive mechanism. More specifically, a damper and a flywheel may be integrally attached to the first carrier or a shaft member connected to the first carrier. The damper used to be provided in the hybrid vehicle so as to absorb torque fluctuations in the internal combustion engine and provide a driving force of the internal combustion engine to the first carrier. Further, the flywheel used to be provided in the hybrid vehicle so as to stabilize the rotation speed of the crankshaft of the internal combustion engine. In a case where the two-motor drive mechanism is reused, the damper and the flywheel can be also included in the two-motor drive mechanism. The damper and the flywheel are also to be accommodated inside the case. The damper and the flywheel both have a circular plate shape.

The motor generator to be accommodated in the case is not limited to a motor generator that used to be attached to the hybrid vehicle. A motor generator that used to be attached to another electric vehicle may be reused and accommodated in the case. Further, instead of reusing the motor generator, a new motor generator may be attached to the case by use of the attachment.

What is claimed is:

1. A motor attachment structure for an electric vehicle, the motor attachment structure comprising:
    a case configured to accommodate:
        a motor including a tubular rotor configured to rotate together with an output shaft in an integrated manner, and a tubular stator placed radially outwardly from the rotor when the stator is viewed from the output shaft;
        a tubular bearing configured to rotatably support the output shaft or a rotating body configured to rotate together with the output shaft in an integrated manner; and
    an attachment attached to the case, wherein
    the attachment includes:
        a main body portion having a plate shape and placed at a position facing the motor in a direction along a central axis of the output shaft; and
        a projecting portion projecting from the main body portion toward the motor,
    a through hole is provided on the main body portion, the through hole penetrating through the attachment in the direction along the central axis of the output shaft,
    the main body portion includes a first small-diameter portion and a first large-diameter portion, the first large-diameter portion having a diameter larger than the first small-diameter portion,
    the main body portion is formed with a first stepped surface that is a surface between the first large-diameter portion and the first small-diameter portion;
    an inner peripheral surface of the first large-diameter portion is configured to support an outer peripheral surface of the bearing,
    the first stepped surface is configured to support an end surface of the bearing,
    the projecting portion has a tubular shape and is placed such that a central axis of the projecting portion coincides with the central axis of the output shaft,
    the projecting portion includes a second small-diameter portion and a second large-diameter portion, the second large-diameter portion having a diameter larger than the second small-diameter portion,
    the projecting portion is formed with a second stepped surface that is a surface between the second large-diameter portion and the second small-diameter portion,
    an inner peripheral surface of the second large-diameter portion is configured to support an outer peripheral surface of the stator,
    the second stepped surface is configured to support a first end surface of the stator, and
    the first stepped surface and the second stepped surface face a same direction along the central axis of the output shaft.

2. The motor attachment structure according to claim 1, wherein:
    the case includes a terminal block to which a power supply line placed outside the case is connected; and
    the stator includes a bus bar via which a current is applied to the stator, and an intermediate bus bar via which the bus bar is connected to the terminal block.

3. The motor attachment structure according to claim 2, wherein the bus bar is connected to a second end surface of the stator which is opposite to the first end surface of the stator.

4. The motor attachment structure according to claim 1, further comprising:
- a connecting shaft placed adjacent to the output shaft in the direction along the central axis of the output shaft such that a central axis of the connecting shaft coincides with the central axis of the output shaft; and
- a clutch configured to switch between transmission and non-transmission of torque between the output shaft and the connecting shaft, wherein the clutch is integrally attached to the motor.

5. The motor attachment structure according to claim 1, wherein
- the first end surface of the stator is attached to the second stepped surface by a plurality of bolts,
- the plurality of bolts are configured to penetrate through the stator in the direction along the central axis of the output shaft.

* * * * *